(12) United States Patent
Doyle

(10) Patent No.: US 7,249,794 B2
(45) Date of Patent: Jul. 31, 2007

(54) OPPOSED DRAWER ASSEMBLY FOR VEHICLES

(75) Inventor: Ronald A. Doyle, Yakima, WA (US)

(73) Assignee: Western Recreational Vehicles, Inc. DE (US)

(*) Notice: Subject to any disclaimer, the term of this patent is extended or adjusted under 35 U.S.C. 154(b) by 135 days.

(21) Appl. No.: 11/178,228

(22) Filed: Jul. 8, 2005

(65) Prior Publication Data

US 2007/0007784 A1 Jan. 11, 2007

(51) Int. Cl.
*B60R 5/00* (2006.01)

(52) U.S. Cl. .............. 296/37.1; 296/37.6; 296/26.13; 296/164

(58) Field of Classification Search .............. 296/37.1, 296/26.13, 37.6, 26.03, 164, 156, 190.11; 224/281, 538, 542–544
See application file for complete search history.

(56) References Cited

U.S. PATENT DOCUMENTS

| | | | |
|---|---|---|---|
| 2,784,027 A | | 3/1957 | Temp |
| 3,431,042 A | * | 3/1969 | Pipe .............................. 384/18 |
| 3,449,033 A | * | 6/1969 | Pipe ...................... 312/334.11 |
| 3,471,045 A | | 10/1969 | Panciocco |
| 4,159,844 A | * | 7/1979 | Weiner ..................... 52/169.12 |
| 4,681,360 A | | 7/1987 | Peters et al. |
| 4,824,158 A | | 4/1989 | Peters et al. |
| 5,026,176 A | | 6/1991 | Jensen et al. |
| 5,125,710 A | | 6/1992 | Gianelo |
| 5,564,767 A | | 10/1996 | Strepek |
| 5,775,787 A | * | 7/1998 | Gasser .................. 312/334.12 |
| 5,893,619 A | | 4/1999 | Nachbaur |
| 5,921,615 A | * | 7/1999 | Gimenez ..................... 296/164 |
| 6,022,181 A | | 2/2000 | Wolterstorff et al. |
| 6,244,646 B1 | | 6/2001 | Wheeler, III |
| 6,328,365 B1 | | 12/2001 | Adsit |
| 6,390,525 B2 | | 5/2002 | Carpenter et al. |
| 6,398,283 B1 | | 6/2002 | Knudtson et al. |
| 6,742,979 B1 | | 6/2004 | Salazar |
| 6,793,260 B2 | | 9/2004 | Crean |
| 6,869,092 B1 | | 3/2005 | Henn |

* cited by examiner

*Primary Examiner*—Dennis H. Pedder
*Assistant Examiner*—Michael Hernandez
(74) *Attorney, Agent, or Firm*—Stratton Ballew PLLC

(57) ABSTRACT

A drawer assembly for vehicles, and more particularly to a system of opposed drawers for use in a vehicle or trailer. The drawers integrate into the structure of a vehicle for storage or concealment of the retractable features, and can cantilever out and away from the storage compartment, when the drawers extend. The drawer assembly includes an upper drawer and a lower drawer, the bottom or pan of the upper drawer bottom located in substantially the same horizontal plane as the bottom of the lower drawer. An upper drawer rail mounts to the upper drawer and a lower drawer rail mounts to the lower drawer. The upper and lower drawer rails have a rail length greater than the drawer length. The upper drawer rail is slidably received by a bulkhead upper rail, and the lower drawer rail slidably received by a bulkhead lower rail, the bulkhead lower rail positioned parallel to and directly beneath the bulkhead upper rail, and an extended rail portion of the upper drawer rail is positioned directly above the lower drawer rail, when both the upper drawer the lower drawer assembly are in a retracted position. Trucks or bearing blocks may serve as the bulkhead rails.

24 Claims, 8 Drawing Sheets

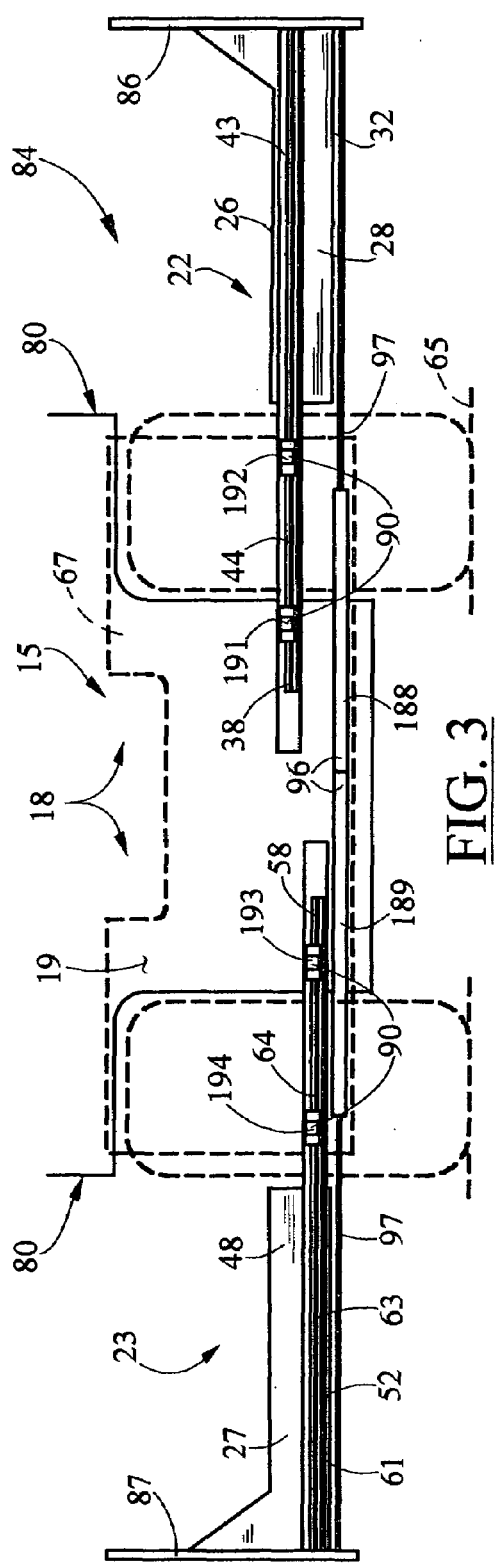
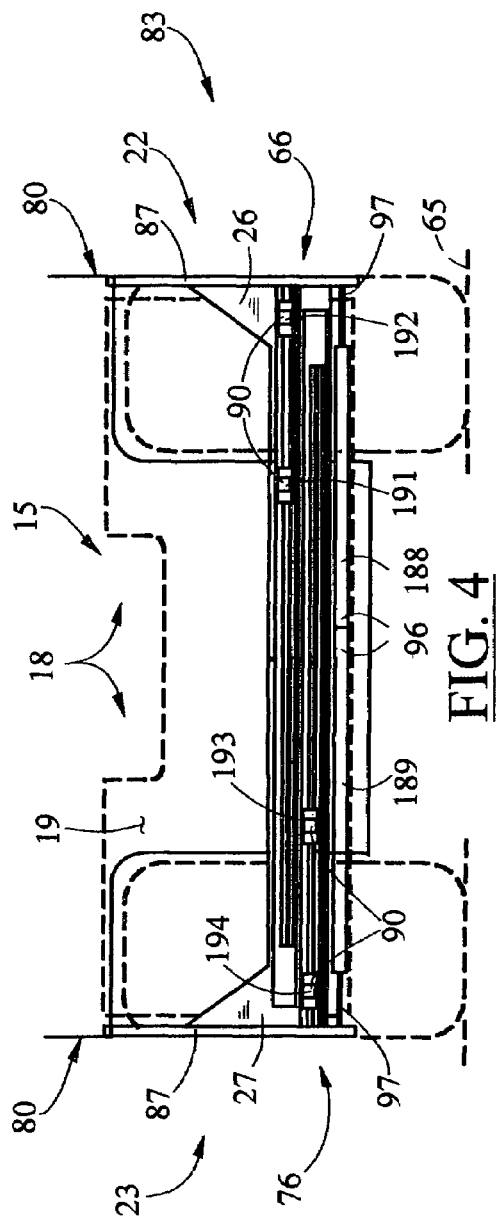

OPPOSED DRAWER ASSEMBLY FOR VEHICLES

TECHNICAL FIELD

The invention relates to a drawer assembly for vehicles, and more particularly to a system of opposed drawers for use in a vehicle or trailer, the drawers integrated into the structure of a vehicle for storage or concealment of retractable features.

BACKGROUND OF THE INVENTION

Externally accessed storage compartments are a common feature in trailers, trucks, busses, motor homes and recreational vehicles. Storage compartments, cargo areas, lockers and "stowage" are typically accessed from the exterior of the vehicles by doors, mounted on the outside surface of the vehicle. To provide for easier access to these interior storage compartments; drawers, trays and bins have been utilized. An example of a storage drawer is found in U.S. Pat. No. 6,328,365, to Adsit, which discloses an assembly for two drawers that suspend from a common pair of rails within a truck. The drawers are accessible from opposite sides of the truck. A disadvantage of this assembly is that the drawers, when fully extended from the truck, are only supported by a tip end of their slides. If the drawers contain heavy objects, the drawers will tend to tip down, breaking off and away from the rails.

An example of a "slide out" tray or deck is disclosed in U.S. Pat. No. 6,869,092 to Henn, which discloses a deck that is slideably movable from a retracted position beneath a vehicle to an extended position at only one side of the vehicle. An extendable tray system is needed that provides for extension from both sides of a vehicle, the tray having the same height on both vehicle sides.

The present invention addresses the failings of prior vehicle drawer mechanisms, and can be understood by reference to the following detailed description taken in conjunction with the accompanying drawings.

BRIEF DESCRIPTION OF DRAWINGS

FIG. 3 is a partially sectioned side elevation view of an opposed drawer assembly, according to an embodiment of the invention;

FIG. 4 is a partially sectioned side elevation view of an opposed drawer assembly, according to an embodiment of the invention;

DETAILED DESCRIPTION OF SPECIFIC EMBODIMENTS

Figure 1:
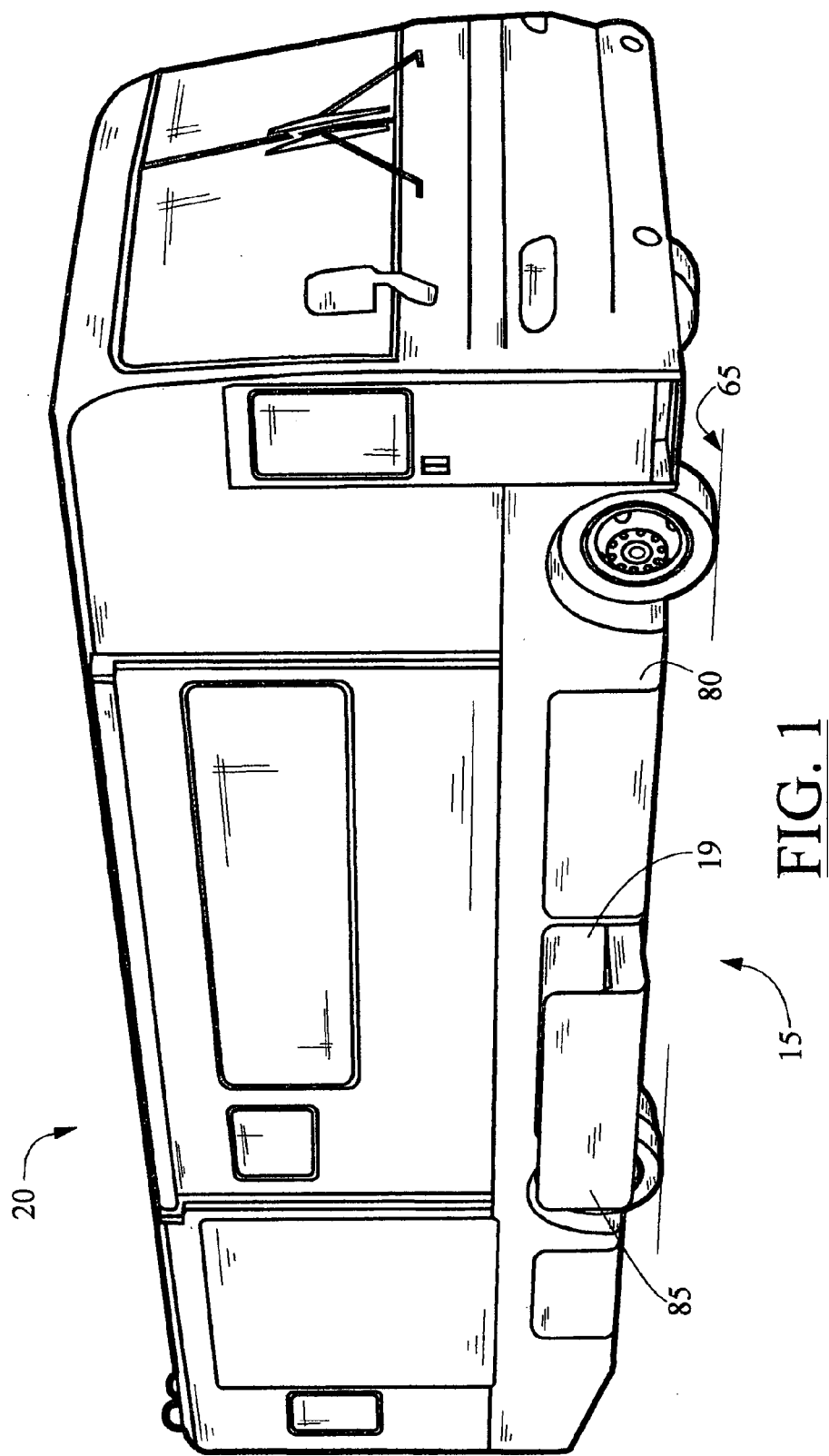
FIG. 1 is a perspective view of an opposed drawer assembly, according to an embodiment of the invention.

The invention provides a system of opposed drawers, and more particularly an opposed drawer system 15, as shown in FIGS. 1 through 9. For the invention, the drawer system includes stacked drawer rails 17, which provide the system with the advantage of allowing a pair of opposed drawers 18 to extend from and retract into a storage compartment 19, without mechanical interference between the pair of opposed drawers or their rails. The opposed drawer system of the present invention is especially suited for use with a vehicle 20, preferably a recreational vehicle or "RV," which typically have large storage compartments, which are spaces or "holds," often built within their undercarriages.

Figure 5:
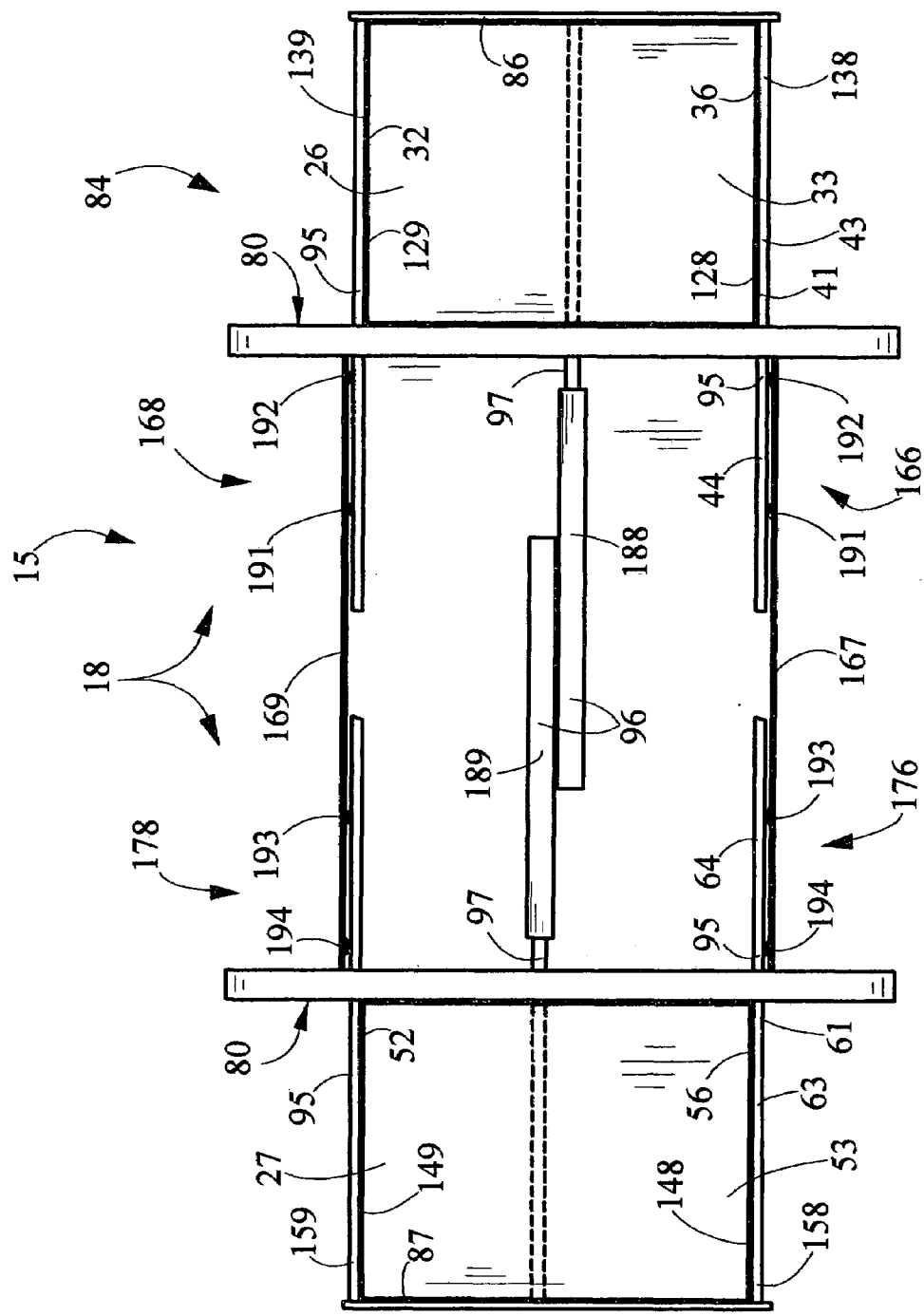
FIG. 5 is a top view of an opposed drawer assembly, according to an embodiment of the invention.

As detailed in FIGS. 3 and 4, the opposed drawer system 15 has an upper drawer assembly 22 and a lower drawer assembly 23. The upper drawer assembly includes an upper drawer 26, and the lower drawer assembly includes a lower drawer 27. As preferably employed for drawers, the upper drawer, or "first drawer," is positioned opposed to the lower drawer, or "second drawer," as shown in FIG. 5. For the purpose of the present invention, the opposed upper and lower drawers could alternatively also be in the form of opposed trays, platforms or "slide-outs."

The upper drawer 26 and the lower drawer 27 both have sides, as do all conventional drawers. Specifically, the upper drawer includes an upper drawer side 28, as detailed in FIG. 3. When, in an alternative to drawers, trays are employed, the "sides" may be small upturns in a tray bottom 30, located between the sides of the tray or drawer, as preferred. The upper drawer side has an upper side length 32, and an upper drawer bottom 33. The upper drawer bottom separates the upper side from an opposing upper side, and the upper side length is the length of an upper joining 36, between the upper drawer sides and the upper drawer bottom. The upper drawer bottom may be a "pan" or a tray, or any other similar element. Additionally, an upper drawer rail 38 mounts to the upper drawer side of the upper drawer.

The upper drawer rail 38 can be formed from a metal strip or bar, with preferably a "C," or an "L" shape, when viewed end-on. A "Z," "I," "T," or "S" shape, or any other conventional rail form, are also considered as potential shapes for the upper drawer's rails. The upper drawer rail has an upper drawer rail length 41, which is greater than the upper side length 32. A preferred rail length for the upper drawer rail is approximately twice the upper side length, shown in FIG. 3. This longer length of the upper drawer rail, relative to length of the upper drawer side 28, allows the upper drawer 26 to extend fully or open for exterior access, while still providing support of the upper drawer, from the structure of the vehicle 20, adjacent to the storage compartment 19. This feature is discussed further, later in the present description. The upper drawer rail has an upper drawer rail portion 43 and an upper extended rail portion 44. The upper drawer rail portion of the upper drawer rail is positioned along the upper drawer side 28 of the upper drawer.

The lower drawer 27 includes a lower drawer side 48, as also detailed in FIG. 3, and similar to the upper drawer 26. For the lower drawer, the lower drawer side has a lower drawer side length 52, and a lower drawer bottom 53. The lower drawer bottom separates the lower side from an opposing lower side, and the lower side length is the length of a lower joining 56, which is located between the lower drawer sides and the lower drawer bottom. Like the upper drawer bottom 33, the lower drawer bottom may be a "pan"

or a tray, or any other similar element. Additionally, a lower drawer rail 58 mounts to the lower drawer first side.

The lower drawer rail 58 can be fabricated from a metal strip or bar, as discussed above in reference to the upper drawer rail 38, with preferably a "C" or "L" shape, when viewed end-on, as with the upper drawer rail 38. Alternatively, the lower drawer rails preferably have a "Z," "I," "T," or "S" shape, or any other conventional rail form, as potential shapes for the lower rail. The lower drawer rail has a lower drawer rail length 61, which is greater than the lower side length 52. A preferred rail length for the lower drawer rail is shown in FIG. 5. As described for the upper drawer assembly 22, above, this longer length of the lower rail, relative to length of the lower side, allows the lower drawer 27 to extend fully or open for access from outside the lower drawer, while still providing structural support for the drawer, from the structure of the vehicle 20, adjacent to the storage compartment 19.

The lower drawer rail 58 has a lower drawer rail portion 63, and a lower extended rail portion 64. In the operational configuration of the lower drawer assembly 23, as shown in FIG. 3, the lower drawer rail portion 63 of the lower drawer rail 58 is positioned along the lower drawer side 48 of the lower drawer 27.

Most preferably, the upper drawer bottom 33 is located in substantially the same horizontal plane as the lower drawer bottom 53, as shown in FIGS. 3 and 4. By the "same horizontal plane," the bottom or "pan" of the upper drawer are at the same or a common level, at the same distance from a ground surface 65 beneath the vehicle 20. The upper drawer rail 38 is slidably received by a bulkhead upper rail 66, and the bulkhead upper rail is mountable to a bulkhead 67. The term "bulkhead" is used in the present specification and attached claims, to refer to an interior partition or wall of a ship, airplane, or any vehicle 20 of the sea, air or land, such as a recreational vehicle, a tow-able trailer, a truck or an automobile. The bulkhead serves as substantially vertical partitions, separating the storage compartment 19, which receives the opposed drawer system 15 of the present invention, from the rest of the vehicle.

Figure 6:
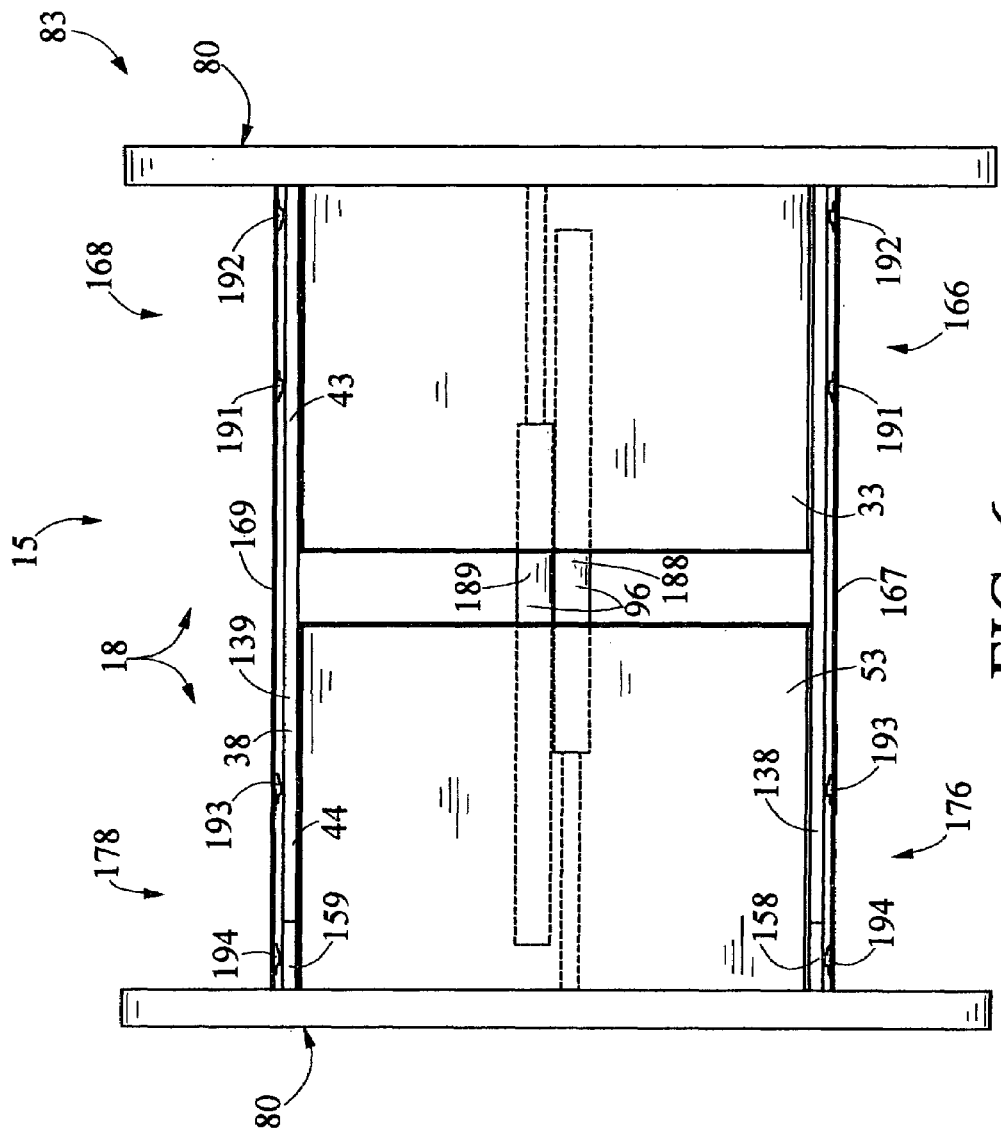
FIG. 6 is a top view of an opposed drawer assembly, according to an embodiment of the invention.
Figure 7:
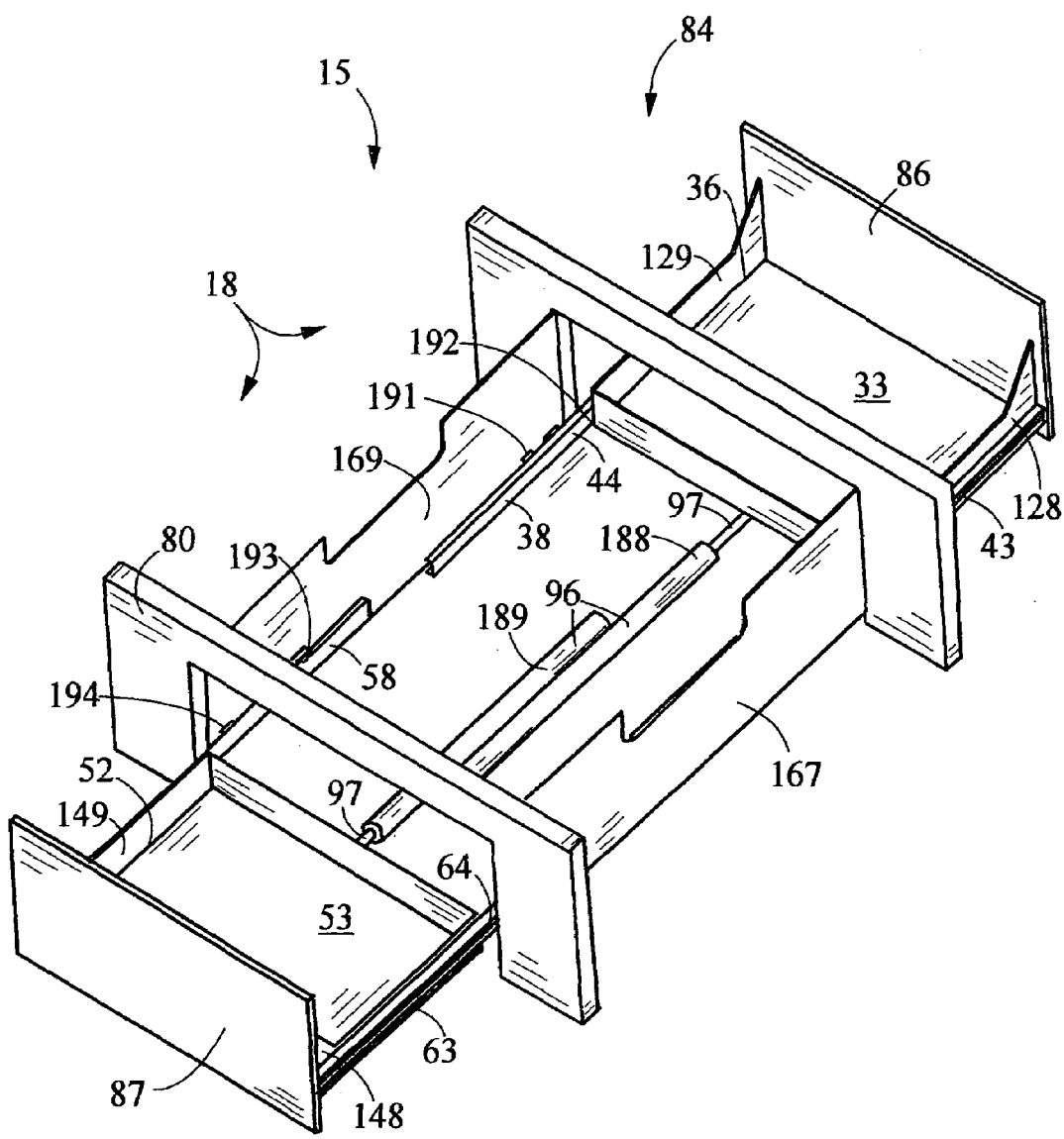
FIG. 7 is a perspective view of an opposed drawer assembly, according to an embodiment of the invention.
Figure 8:
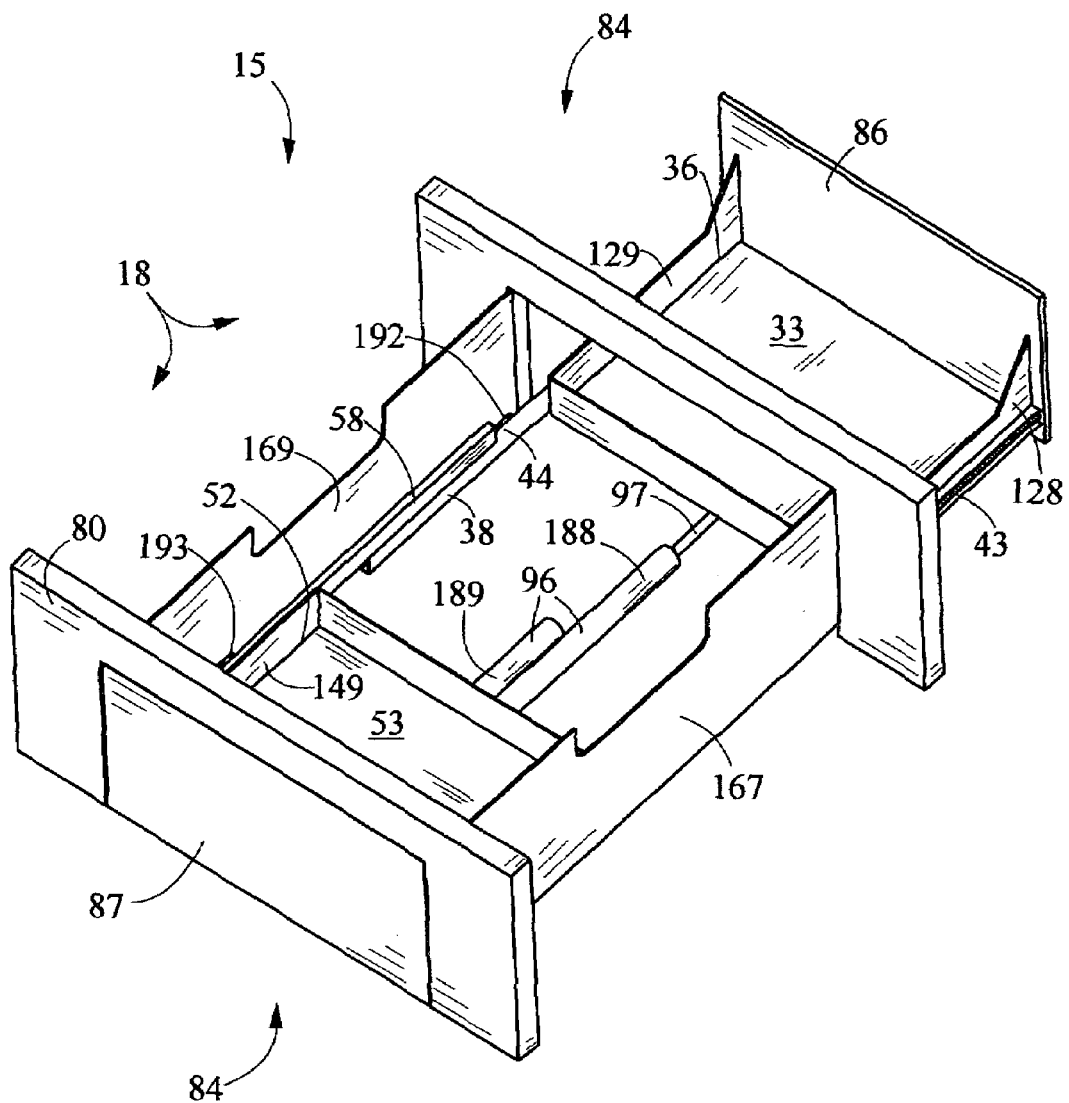
FIG. 8 is a perspective view of an opposed drawer assembly, according to an embodiment of the invention.

As shown in FIG. 6, and similar to the upper drawer assembly 22, the lower drawer rail 58 is slidably received into a bulkhead lower rail 76. The bulkhead lower rail is mountable to the bulkhead 67, and the bulkhead lower rail is most preferably positioned or oriented, parallel to and directly beneath the bulkhead upper rail 66. In a top view, as shown in FIG. 6, the bulkhead lower rail overlaps the bulkhead upper rail. In a side view, as shown in FIG. 4, the bulkhead lower rail is directly above the bulkhead upper rail.

The upper drawer assembly 22 and the lower drawer assembly 23, are each movable from a retracted position 83, as shown in FIG. 3, to an extended position 84, as shown in FIG. 4. In the retracted position, the upper drawer 26 or the lower drawer 27 are fully enclosed within the storage compartment 19 of the vehicle 20. Each drawer assembly preferably includes a door face panel 85. As shown in FIG. 4, an upper door face panel 86 covers the exposed exterior portion of the upper drawer assembly, when the upper drawer assembly is in the retraced position, and a lower door face panel 87 covers the exposed exterior portion of the lower drawer assembly, when the lower drawer assembly is in the retraced position.

Most preferably, the upper door face panel 86 is flush to an exterior surface 80 of the vehicle 20, when the upper drawer assembly 22 is in the retraced position 83. Additionally, the lower door face panel 87 is flush to the exterior surface 80 of the vehicle 20, when the lower drawer assembly 23 is in the retraced position.

To operate the opposed drawer system 15 of the present invention, a drawer drive 88 is preferably employed as an element of the upper drawer assembly 22 and the lower drawer assembly 23. Several alternative mechanisms can be employed as the drawer drive, to move the upper drawer 26, or the lower drawer 27, between the retracted position 83 and the extended position 84, and conversely between the extended position and the retracted position. These drawer drives can include motorized systems with electric motors to operate the drawers, and employ gears or pinions and racks; or simple manual push-pull systems, optionally supplemented with counterweights or springs to aid in the movement of the drawers; or pneumatic actuator systems; or servos; or any other mechanical, electrical or electromagnetic system; or, as most preferred, a hydraulic drawer drive system.

In this preferred drawer drive system 88 employing hydraulic power, an upper actuator 188 is positioned beneath the pair of opposed drawers 18, alongside a lower actuator 189, as shown in FIGS. 3 and 5. Both the upper actuator and the lower actuator include a cylinder 96 that mounts to the vehicle 20, and a piston 97 that attaches to one of the pair of opposed drawers. Most preferably, as shown in FIG. 3, the piston of the upper actuator attaches to the upper drawer face panel 86, and the piston of the lower actuator attaches to the lower drawer face panel 87.

In a preferred embodiment of the present invention, the drawer drive system 88 is operated remotely, with a remote transmitter or "key fob," programmed to a receiver within the vehicle 20, that allow keyless entry into the vehicle and remote operation of the drive system, to alternatively extend or retract the pair of opposed drawers 18. This keyless, automatic operation of the opposed drawer system 15 allows the upper drawer face panel 86 and the lower drawer face panel 87 to be mounted flush to the exterior surface 80 of the vehicle, as shown in FIG. 1. A significant advantage of the present invention is that no external handle, latch, key hole, crank or access is needed to open either of the pair of opposed drawers 18.

In the extended position 84, each of the pair of opposed drawers 18 are open to the exterior of the vehicle, and ready for the placement or removal of items into the drawers. As shown in FIG. 3, when the upper drawer assembly 22 is in the extended position 84, the upper extended rail portion 44 of the upper drawer rail 38 is held and supported by the bulkhead upper rail 66. Additionally, when the lower drawer assembly 23 is in the extended position, the lower extended rail portion 64 of the lower drawer rail 58 is held and supported by the bulkhead lower rail 76.

As also shown in FIG. 4, and as preferred for the present invention, when the upper drawer assembly 22 and the lower drawer assembly 23 are both in the retracted position 83, the upper extended rail portion 44 of the upper drawer assembly's upper drawer rail 38 is positioned directly above the lower drawer rail portion 63 of the lower drawer assembly's lower drawer rail 58.

In a preferred alternative of the present invention, a set of rail guides 90, mount to the bulkhead 67, and serve as the substantially horizontally mounted bulkhead rails, to receive each drawer rail. Preferably, "trucks" or bearing mounts are attached to the bulkheads to serve as the bulkhead rails. The trucks may be any conventional gripping rail or block system, which typically include a wheeled ball bearing or sliding mechanism. Most preferably, an upper truck 91 mounts to the bulkhead, serving as the bulkhead upper rail 66, and a lower truck 93 mounts on the bulkhead, serving as the bulkhead lower rail 67. Each truck receives and guides the travel of the respective drawer rail, as the drawers move back-and-forth, which is from the extended position 84 to the retracted position 83, and returning to the extended position, as desired.

When the upper drawer 26 is in the retracted position 83, the upper truck 91 engages and slidingly grasps the upper drawer rail portion 43 of the upper drawer rail 38. When the upper drawer is in the extended position 84, the upper truck remains stationary, firmly mounted on the bulkhead 67, to engage and slidingly grasp the upper extended rail potion 44 of the upper drawer rail.

Specifically, the upper truck 91 mounts on the bulkhead 67, within the storage compartment 19, to receives the upper drawer rail 38. Most preferably, as shown in FIGS. 3 and 4, the upper truck is a pair of upper trucks, namely an inner upper truck 191, and an outer upper truck 192, each mounted to engage and slidingly grasp the upper drawer rail potion 43 of the upper drawer rail 38. Preferably, when the upper drawer 26 is in the retracted position 83, the outer upper truck is permanently located, preferably with bolts or screws, on the bulkhead near the upper drawer face panel 86, and the inner upper truck is permanently located on the bulkhead near the upper extended rail potion 44. These preferred locations of the upper trucks provide for optimally leveraged support, when the upper drawer is in the extended position 84, while additionally allowing for full extension of the upper drawer from the storage compartment 19.

Similarly, when the lower drawer 27 is in the retracted position 83, the lower truck 93 engages and slidingly grasps the lower drawer rail potion 63 of the lower drawer rail 58. When the lower drawer is in the extended position 84, the lower truck remains stationary, firmly mounted on the bulkhead 67, to engage and slidingly grasp the lower extended rail potion 64 of the lower drawer rail.

Specifically, the lower truck 93 mounts on the bulkhead 67, within the storage compartment 19, to receive the lower drawer rail 58. Most preferably, as shown in FIG. 5, the lower truck is a pair of lower trucks, namely an inner lower truck 193, and an outer lower truck 194, each mounted to engage and slidingly grasp the lower drawer rail potion 63 of the lower drawer rail 58. Preferably, when the lower drawer 27 is in the retracted position 83, the outer lower truck is permanently located, preferably with bolts or screws, on the bulkhead near the upper drawer face panel 86, and the inner upper truck is permanently located on the bulkhead near the lower extended rail potion 64. These preferred locations of the lower trucks provide for optimally leveraged support, when the lower drawer is in the extended position 84, while additionally allowing for full extension of the lower drawer from the storage compartment 19.

As an additional alternative to the preferred drawer rail and rail guide system, described above, the upper truck 91 and lower truck 93 may be employed in addition to the upper bulkhead rail 66 and lower bulkhead rail 76, respectively, instead of replacing them.

Figure 2:
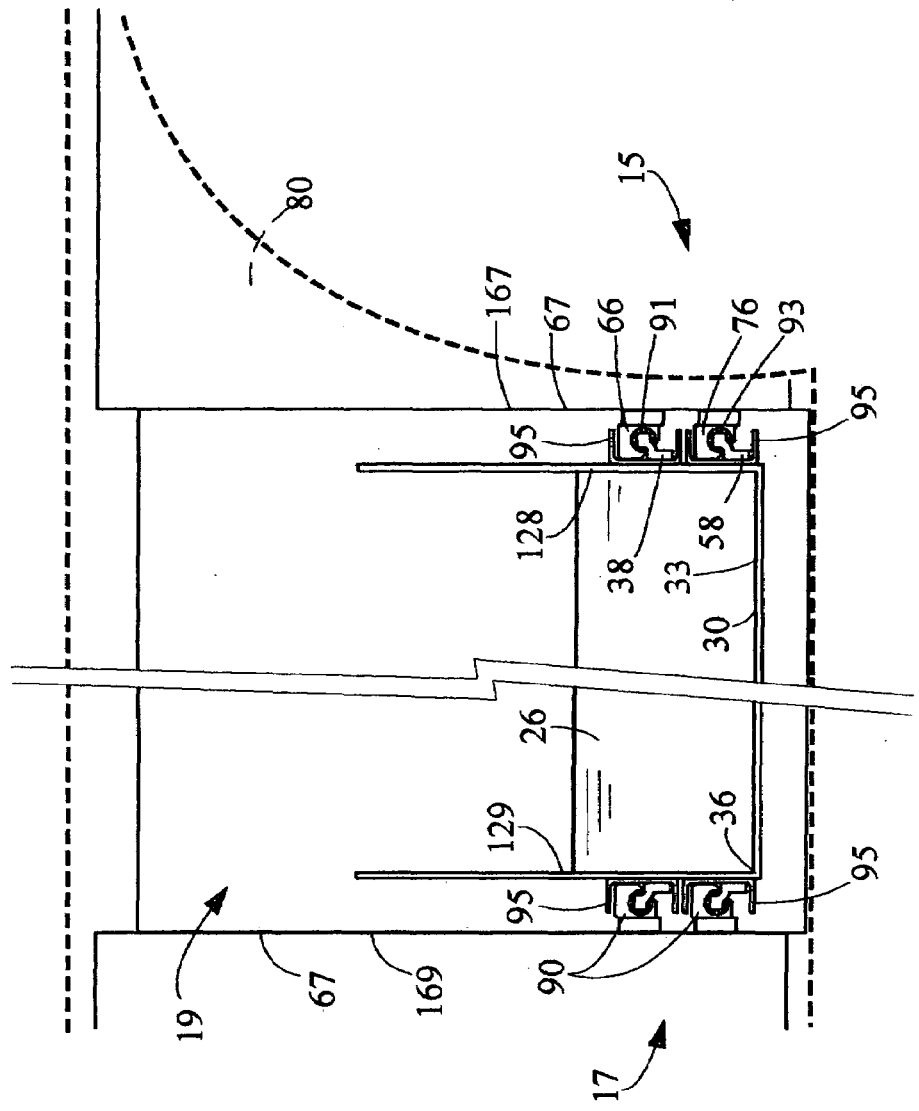
FIG. 2 is a partially sectioned front elevation view of an opposed drawer assembly, according to an embodiment of the invention.

Most preferably, as detailed in FIG. 2, the drawer rail and rail guide system for use with the present invention is the DryLin® W linear guide system, as manufactured by igus USA, Inc., of E. Providence, R.I., with part number WSQ-20, for use as a preferred set of rail guides 90, specifically, the upper truck 91 and the lower truck 93, essentially employed as bulkhead rails. Additionally, DryLin® part number WJQM-01-20, is a preferred alternative for use as the upper drawer rail 38, and the lower drawer rail 58. The DryLin® systems provides a smoothly operating, dust and dirt resistant and low friction drawer rail and rail guide. Additionally, both the upper drawer rail and the lower drawer rail preferably includes a support channel 95, which is most preferably a "C" shaped element formed of a high strength extruded aluminum, or alternatively a stainless steel, employed to support and "house" the upper drawer rail and the lower drawer rail, as shown in FIG. 2.

Preferably, the opposed drawer system 15 of the present invention includes stacked drawer rails 17, on both sides of the upper drawer assembly 22 and the lower drawer assembly 23. As discussed previously herein, the upper drawer 26 and the lower drawer 27 both have sides, as do all conventional drawers. Specifically, the upper drawer includes a upper drawer first side 128 and an upper drawer second side 129, as detailed in FIG. 9. For the upper drawer, the upper drawer first side and the upper drawer second side both have the upper side length 32, and the upper drawer bottom 33. The first upper side and the second upper side are separated by the upper drawer bottom, and the upper side length is the length of the upper joining 36, between the upper drawer sides and the upper drawer bottom. Additionally, an upper drawer first rail 138 mounts to the upper drawer first side of the upper drawer, and an upper drawer second rail 139 mounts to the upper drawer second side of the upper drawer.

The upper drawer first rail 138 and the upper drawer second rail 139 can be fabricated from a metal strip or bar, with preferably a "C," or a "L" shape, when viewed end-on. The upper drawer first rail has the upper drawer rail length 41, which is greater than the upper side length 32. A preferred rail length for the upper drawer first rail is approximately twice the upper side length, shown in FIG. 3. This longer length of the upper drawer rail, relative to length of the upper drawer first side 128, allows the upper drawer 26 to extend fully, or open for exterior access, while still providing support of the upper drawer, from the structure of the vehicle 20, adjacent to the storage compartment 19. Again, this feature is discussed further, later in the present description.

The upper drawer first rail 138 also has the upper drawer rail portion 43 and the upper extended rail portion 44. The upper drawer rail portion of the upper drawer first rail is positioned along the upper drawer first side 128 of the upper drawer 26. Similarly, the upper drawer rail portion of the second upper drawer rail is positioned along the upper drawer second side 129 of the upper drawer.

Figure 9:
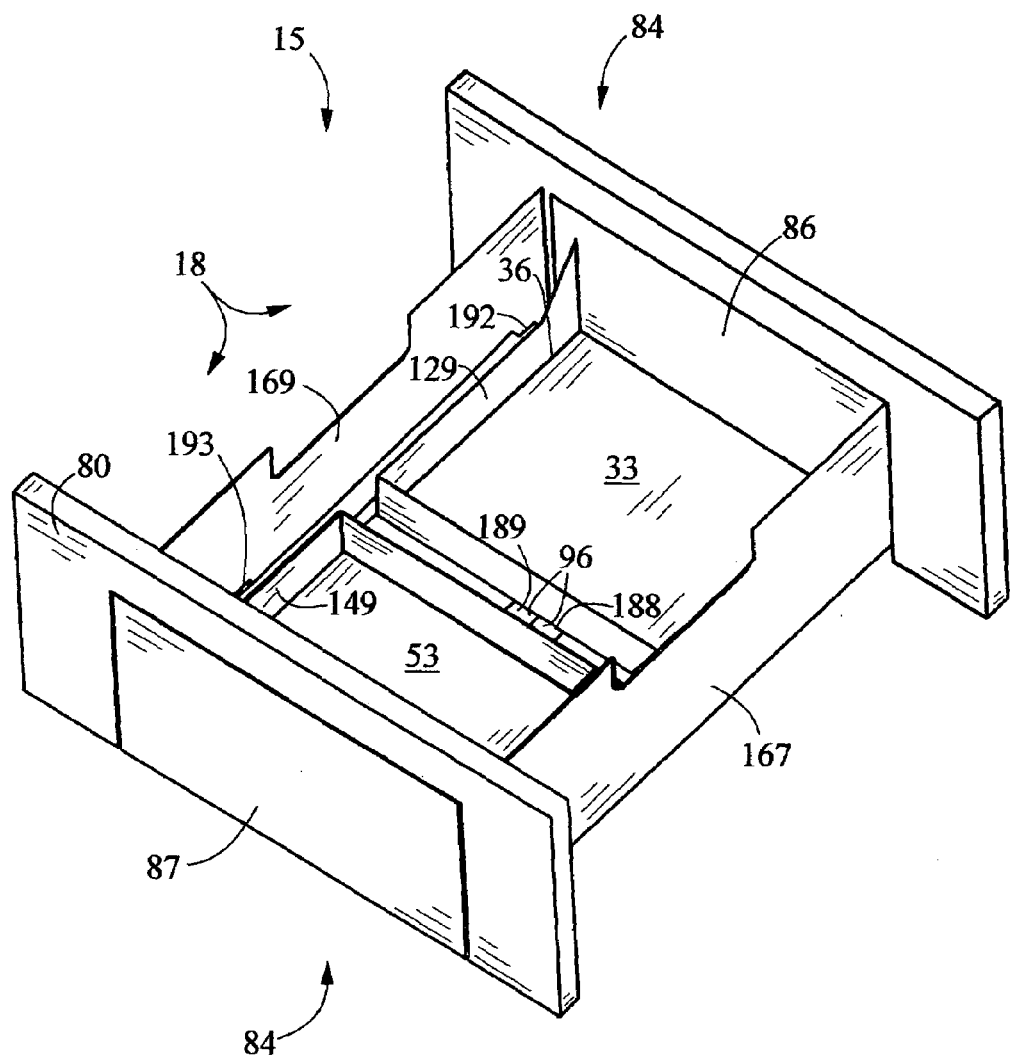
FIG. 9 is a perspective view of an opposed drawer assembly, according to an embodiment of the invention.

The lower drawer 27 includes a lower drawer first side 148 and a lower drawer second side 149, as also detailed in FIG. 9, and similar to the upper drawer 26. For the lower drawer, the lower drawer first side and the lower drawer second side both have the lower drawer side length 52, and the lower drawer bottom 53. The lower drawer first side and the lower drawer second side are separated by the lower drawer bottom, and the lower side length is the length of the lower joining 56, which is located between the lower drawer sides and the lower drawer bottom. Additionally, a lower drawer first rail 158 mounts to the lower drawer first side, and a lower drawer second rail 159 mounts to the lower drawer second side.

The lower drawer first rail 158 and the lower drawer second rail 59 can be fabricated from a metal strip or bar, with preferably a "C," or a "L" shape, when viewed end-on, as with the first upper drawer rail 138 and the second upper drawer rail 139. Again, any other conventional rail form is also considered as potential shapes for the lower rail. The first lower drawer rail has the lower drawer rail length 61, which is greater than the lower side length 52. As described for the upper drawer assembly 22, this longer length of the lower rail, relative to length of the lower side, allows the lower drawer 27 to extend fully, or open for access from outside the lower drawer, while still providing structural support for the drawer, from the structure of the vehicle 20, adjacent to the storage compartment 19.

The lower drawer first rail 158 has the lower drawer rail portion 63, and the lower extended rail portion 64. In the operational configuration of the lower drawer assembly 23, as shown in FIG. 4, the lower drawer rail portion 63 of the lower drawer first rail 158 is positioned along the lower drawer first side 148 of the lower drawer 27. Similarly, the lower drawer rail portion of the lower drawer second rail 159 is positioned along the second lower side 149 of the lower drawer. With the opposed drawer system 15 of the present invention, both the upper drawer and the lower drawer can be "cantilevered," or supported from the respective bulkhead rails, when the drawer is in the extended position 84, while only the respective extended rail portions of the upper and lower drawers are held by the bulkhead rails, namely the bulkhead upper rail 66 and the bulkhead lower rail 76. As discussed herein above, the bulkhead rails are preferably embodied by the set of rail guides 90, or the respective trucks, namely the upper truck 91 and the lower truck 92. The feature of cantilevered drawers is a primary advantage of the present invention. With the drawers fully extended, away from the storage compartment 19, as shown in FIG. 3, easy access to the drawers is provided, and with the stacked drawer rails 17 of the present invention, the upper and lower drawers can then retract fully, flush with the exterior surface 80 of the vehicle 20.

Most preferably, the upper drawer bottom 33 is located in substantially the same horizontal plane as the lower drawer bottom 53, as shown in FIGS. 3 and 4. The upper drawer first rail 138 is slidably received by a first bulkhead upper rail 166, and the first bulkhead upper rail is mountable to a first bulkhead 167. Again, the term "bulkhead" is used in the present specification and attached claims, to refer to an interior partition or wall of a ship, airplane, or any vehicle 20 of the sea, air or land, such as a recreational vehicle, a tow-able trailer, a truck or an automobile. The bulkheads each serve as substantially vertical partitions, separating the storage compartment 19 from the rest of the vehicle.

Similar in form and function to the upper drawer first rail 138, the upper drawer second rail 139 is slidably received by a second bulkhead upper rail 168, and the second bulkhead upper rail is mountable to a second bulkhead 169. The second bulkhead is preferably parallel to the first bulkhead, and together with the first bulkhead, defines the limits of the storage compartment 19 within the vehicle 20, which receives the opposed drawer system 15 of the present invention.

As shown in FIG. 5, and similar to the upper drawer assembly 22, the lower drawer first rail 158 is slidably received into a first bulkhead lower rail 176. The first bulkhead lower rail is mountable to the first bulkhead 167, and the first bulkhead lower rail is most preferably positioned or oriented, parallel to and directly beneath the first bulkhead upper rail 166. In a top view, as shown in FIG. 6, the first bulkhead lower rail overlaps the first bulkhead upper rail. In a side view, as shown in FIG. 4, the first bulkhead lower rail is directly above the first bulkhead upper rail.

Similar to the lower drawer first rail 158, the lower drawer second rail 159 is slidably received by a second bulkhead lower rail 178, as shown in FIG. 5. The second bulkhead lower rail is mountable to the second bulkhead 169, and the second bulkhead lower rail is most preferably positioned parallel to and directly beneath the second bulkhead upper rail 168. Again, in the top view, as shown in FIG. 5, the second bulkhead lower rail overlaps the second bulkhead upper rail. In a side view, as shown in FIG. 3, the second bulkhead lower rail is directly above the second bulkhead upper rail.

As shown in FIG. 3, when the upper drawer assembly 22 is in the extended position 84, the upper extended rail portion 44 of the upper drawer first rail 138 is held and supported by the first bulkhead upper rail 166. Additionally, when the upper drawer is in the extended position, the upper extended rail portion of the second upper drawer rail 139 is held and supported by the second bulkhead upper rail 168.

As also shown in FIG. 3, when the lower drawer assembly 23 is in the extended position 84, the lower extended rail portion 64 of the lower drawer first rail 158 is held and supported by the first bulkhead lower rail 176. Additionally, when the lower drawer is in the extended position, the lower extended rail 64 portion of the lower drawer second rail 159 is held and supported by the second bulkhead lower rail 178.

As shown in FIG. 4, and as preferred for the present invention, when the upper drawer assembly 22 and the lower drawer assembly 23 are both in the retracted position 83, the upper extended rail portion 44 of the upper drawer assembly's upper drawer first rail 138 is positioned directly above the lower drawer rail portion 63 of the lower drawer assembly's lower drawer first rail 158.

Similarly, as also shown in FIG. 4, and also preferred for the present invention, when the upper drawer assembly 22 and the lower drawer assembly 23 are both in the retracted position 83, the upper extended rail portion 44 of the upper drawer assembly's second upper drawer rail 139 is positioned directly above the lower drawer portion 63 of the lower drawer assembly's lower drawer second rail 159.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The invention claimed is:

1. An opposed drawer system for a vehicle comprising:
    an upper drawer assembly, the upper drawer assembly including an upper drawer, the upper drawer having an upper first side and an upper second side, the upper first side and the upper second side both having an upper side length, an upper drawer bottom, an upper drawer first rail mounted to the upper first side, and an upper drawer second rail mounted to the second upper side, the upper drawer first rail having an upper drawer rail length greater than the upper side length, the upper drawer first rail having an upper drawer rail portion and an upper extended rail portion, the upper drawer rail portion of the first upper drawer rail positioned along the upper first side, and the upper drawer rail portion of the upper drawer second rail positioned along the upper second side;
    a lower drawer assembly, the lower drawer assembly including a lower drawer, the lower drawer having a lower first side and a lower second side, the lower first side and the lower second side both having a lower side length, a lower drawer bottom, a lower drawer first rail mounted to the lower first side, and a lower drawer second rail mounted to the lower second side, the lower first drawer rail having a lower drawer rail length greater than the lower side length, the lower drawer first rail having a lower drawer rail portion and a lower extended rail portion, the lower drawer rail portion of the first lower drawer rail positioned along the lower first side, and the lower drawer rail portion of the lower drawer second rail positioned along the lower second side;

the upper drawer bottom located in substantially the same horizontal plane as the lower drawer bottom;

the upper drawer first rail slidably received by a first bulkhead upper rail, the first bulkhead upper rail mountable to a first bulkhead;

the upper drawer second rail slidably received by a second bulkhead upper rail, the second bulkhead upper rail mountable to a second bulkhead;

the lower drawer first rail slidably received by a first bulkhead lower rail, the first bulkhead lower rail mountable to the first bulkhead, the first bulkhead lower rail positioned parallel to and directly beneath the first bulkhead upper rail;

the lower drawer second rail slidably received by a second bulkhead lower rail, the second bulkhead lower rail mountable to the second bulkhead, the second bulkhead lower rail positioned parallel to and directly beneath the second bulkhead upper rail;

the upper drawer assembly and the lower drawer assembly each movable from a retracted position to an extended position;

the extended rail portion of the upper drawer first rail of the upper drawer assembly held and supported by the first bulkhead upper rail, and the extended rail portion of the upper drawer second rail of the upper drawer assembly held and supported by the second bulkhead upper rail, when the upper drawer assembly is in the extended position;

the extended rail portion of the lower drawer first rail of the lower drawer assembly held and supported by the first bulkhead lower rail, and the extended rail portion of the lower drawer second rail of the lower drawer assembly held and supported by the second bulkhead lower rail, when the lower drawer assembly is in the extended position;

the extended rail portion of the upper drawer first rail of upper drawer assembly positioned directly above the lower drawer portion of the lower drawer first rail of the lower drawer assembly, and the extended rail portion of the upper drawer second rail of upper drawer assembly positioned directly above the lower drawer portion of the lower drawer second rail of the lower drawer assembly, when both the upper drawer assembly and the lower drawer assembly are in the retracted position.

2. The opposed drawer system of claim 1, further comprising:

a drawer drive for moving the upper drawer assembly and the lower drawer assembly from the retracted position to the extended position, and from the extended position to the retracted position.

3. The opposed drawer system of claim 2, wherein:
the drawer drive includes a hydraulic actuator.

4. The opposed drawer system of claim 2, wherein:
a keyless remote is employed to activate the drawer drive.

5. The opposed drawer system of claim 1, wherein:
the upper drawer includes an upper drawer face panel and the upper drawer face panel is flush with an exterior surface of the vehicle; and
the lower drawer includes a lower drawer face panel and the lower drawer face panel is flush with the exterior surface of the vehicle.

6. The opposed drawer system of claim 1, wherein:
a set of rail guides serve as the first bulkhead upper rail, the second bulkhead upper rail, the first bulkhead lower rail and the second bulkhead lower rail.

7. The opposed drawer system of claim 1, wherein:
an upper truck serves as the first bulkhead upper rail and the second bulkhead upper rail; and a lower truck serves as the first bulkhead lower rail and the second bulkhead lower rail.

8. The opposed drawer system of claim 1, wherein:
the upper drawer cantilevers from the first bulkhead upper rail and the second bulkhead upper rail, when the upper drawer is in the extended position; and the lower drawer cantilevers from the first bulkhead lower rail and the second bulkhead lower rail, when the lower drawer is in the extended position.

9. An opposed drawer system for a vehicle comprising:

an upper drawer assembly, the upper drawer assembly including an upper drawer, the upper drawer having an upper side, the upper side having an upper side length, an upper drawer bottom, an upper drawer rail mounted to the upper side, the upper drawer rail having an upper drawer rail length greater than the upper side length, the upper drawer rail having an upper drawer rail portion and an upper extended rail portion, and the upper drawer rail portion of the upper drawer rail positioned along the upper side;

a lower drawer assembly, the lower drawer assembly including a lower drawer, the lower drawer having a lower side, the lower side having a lower side length, a lower drawer bottom, a lower drawer rail mounted tote lower side, the lower drawer rail having a lower drawer rail length greater than the lower side length, the lower drawer rail having a lower drawer rail portion and a lower extended rail portion, and the lower drawer rail portion of the lower drawer rail positioned along the lower side;

the upper drawer bottom located in substantially the same horizontal plane as the lower drawer bottom;

the upper drawer rail slidably received by a bulkhead upper rail, the bulkhead upper rail mountable to a bulkhead, and the lower drawer rail slidably received by a bulkhead lower rail, the bulkhead lower rail mountable to the bulkhead, the bulkhead lower rail positioned parallel to and directly beneath the bulkhead upper rail;

the upper drawer assembly and the lower drawer assembly each movable from a retracted position to an extended position;

the extended rail portion of the upper drawer rail of the upper drawer assembly held and supported by the bulkhead upper rail, when the upper drawer assembly is in the extended position, and the extended rail portion of the lower drawer rail of the lower drawer assembly held and supported by the bulkhead lower rail, when the lower drawer assembly is in the extended position; and the extended rail portion of the upper drawer rail of upper drawer assembly positioned directly above the lower drawer portion of the lower drawer rail of the lower drawer assembly, when both the upper drawer assembly and the lower drawer assembly are in the retracted position.

10. The opposed drawer system of claim 9, further comprising:
a drawer drive for moving the upper drawer assembly and the lower drawer assembly from the retracted position to the extended position, and from the extended position to the retracted position.

11. The opposed drawer system of claim 10, wherein:
the drawer drive includes a hydraulic actuator.

12. The opposed drawer system of claim 10, wherein:
a keyless remote is employed to activate the drawer drive.

13. The opposed drawer system of claim 9, wherein:
the upper drawer includes an upper drawer face panel and the upper drawer face panel is flush with an exterior surface of the vehicle; and
the lower drawer includes a lower drawer face panel and the lower drawer face panel is flush with the exterior surface of the vehicle.

14. The opposed drawer system of claim 9, wherein:
a set of rail guides serve as the bulkhead upper rail, and the bulkhead lower rail.

15. The opposed drawer system of claim 9, wherein:
an upper truck serves as the bulkhead upper rail; and
a lower truck serves as the bulkhead lower rail.

16. The opposed drawer system of claim 9, wherein:
the upper drawer cantilevers from the bulkhead upper rail, when the upper drawer is in the extended position; and
the lower drawer cantilevers from the bulkhead lower rail, when the lower drawer is in the extended position.

17. An opposed drawer assembly for vehicles comprising:
an upper drawer and a lower drawer, the upper drawer including an upper drawer bottom and the lower drawer including a lower drawer bottom, the upper drawer bottom located in substantially a common level as the lower drawer bottom;
the upper drawer having an upper drawer length, and the lower drawer having a lower drawer length;
an upper drawer rail mounted to the upper drawer, and a lower drawer rail mounted to the lower drawer;
the upper drawer rail having an upper drawer rail length greater than the upper drawer length, and the lower drawer rail having a lower rail length greater than the lower drawer length;
the upper drawer rail slidably received by a bulkhead upper rail, and the lower drawer rail slidably received by a bulkhead lower rail, the bulkhead lower rail positioned parallel to and directly beneath the bulkhead upper rail; and
a portion of the upper drawer rail positioned directly above the lower drawer rail, when both the upper drawer the lower drawer are in a retracted position.

18. The opposed drawer system of claim 17, further comprising:
a drawer drive for moving the upper drawer assembly and the lower drawer assembly from the retracted position to the extended position, and from the extended position to the retracted position.

19. The opposed drawer system of claim 18, wherein: the drawer drive includes a hydraulic actuator.

20. The opposed drawer system of claim 18, wherein:
a keyless remote is employed to activate the drawer drive.

21. The opposed drawer system of claim 17, wherein:
the upper drawer includes an upper drawer face panel and the upper drawer face panel is flush with an exterior surface of the vehicle; and
the lower drawer includes a lower drawer face panel and the lower drawer face panel is flush with the exterior surface of the vehicle.

22. The opposed drawer system of claim 17, wherein:
a set of rail guides serve as the bulkhead upper rail, and the bulkhead lower rail.

23. The opposed drawer system of claim 17, wherein:
an upper truck serves as the bulkhead upper rail; and
a lower truck serves as the bulkhead lower rail.

24. The opposed drawer system of claim 17 wherein:
the upper drawer cantilevers from the bulkhead upper rail, when the upper drawer is in the extended position; and
the lower drawer cantilevers from the bulkhead lower rail, when the lower drawer is in the extended position.

* * * * *